United States Patent
Chen et al.

(10) Patent No.: US 10,250,503 B2
(45) Date of Patent: Apr. 2, 2019

(54) ROUTING METHOD AND WIRELESS NODE FOR WIRELESS MESH NETWORK

(71) Applicant: Industrial Technology Research Institute, Hsinchu (TW)

(72) Inventors: Chang-Hsien Chen, Tainan (TW); Kuan-Jen Fang, Tainan (TW); Yi-Cheng Chung, Penghu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/384,334

(22) Filed: Dec. 20, 2016

(65) Prior Publication Data

US 2018/0123957 A1 May 3, 2018

(30) Foreign Application Priority Data

Nov. 2, 2016 (TW) .............................. 105135448 A

(51) Int. Cl.
*H04L 12/741* (2013.01)
*H04L 12/721* (2013.01)
(Continued)

(52) U.S. Cl.
CPC .......... *H04L 45/745* (2013.01); *H04L 45/021* (2013.01); *H04L 45/26* (2013.01);
(Continued)

(58) Field of Classification Search
None
See application file for complete search history.

(56) References Cited

U.S. PATENT DOCUMENTS 7,159,035 B2 1/2007 Garcia-Luna-Aceves et al.
7,319,700 B1 * 1/2008 Kompella ............... H04L 45/02
  370/227
(Continued)

FOREIGN PATENT DOCUMENTS

CN 102711209 10/2012
TW 201036370 10/2010

OTHER PUBLICATIONS

Boushaba et al., "Local node stability-based routing for wireless mesh networks", 2013 IEEE Wireless Communications and Networking Conference (WCNC), Apr. 2013, pp. 1950-1955.
(Continued)

*Primary Examiner* — Steve R Young
(74) *Attorney, Agent, or Firm* — JCIPRNET

(57) ABSTRACT

A routing method for a wireless mesh network and a wireless node performing the method are provided. The method includes performing a route algorithm and finding available paths to reach a destination node, recording the available paths, a parent-child node relationship, and a link-state in a route table, and transmitting or transferring data by using an optimal path among the available paths. The method also includes selecting another available path as the optimal path when the optimal path is not operable, updating the route table, and notifying a parent wireless node. The method further includes performing a block route algorithm when receiving a node-added message for creating a block route table in a block where the newly-added node belongs, updating the route table according to the block route table for acquiring updated available paths, selecting one of the updated available paths as the optimal path, and notifying the parent wireless node.

17 Claims, 5 Drawing Sheets

(51) Int. Cl.
    *H04L 12/755* (2013.01)
    *H04W 40/12* (2009.01)
    *H04W 40/24* (2009.01)
    *H04W 40/30* (2009.01)
    *H04W 84/18* (2009.01)
    *H04W 88/08* (2009.01)

(52) U.S. Cl.
    CPC ......... *H04W 40/12* (2013.01); *H04W 40/246* (2013.01); *H04W 40/30* (2013.01); *H04W 84/18* (2013.01); *H04W 88/08* (2013.01)

(56) References Cited

U.S. PATENT DOCUMENTS

| | | | | |
|---|---|---|---|---|
| 7,454,138 | B2* | 11/2008 | Nozu | H04J 14/0227 398/173 |
| 7,719,960 | B2* | 5/2010 | Atlas | H04L 45/00 370/222 |
| 7,940,669 | B2 | 5/2011 | Vaswani et al. | |
| 7,969,889 | B2 | 6/2011 | Vaswani et al. | |
| 8,155,007 | B2 | 4/2012 | Thubert et al. | |
| 8,233,905 | B2 | 7/2012 | Vaswani et al. | |
| 8,488,589 | B2 | 7/2013 | Rudnick et al. | |
| 8,515,433 | B2 | 8/2013 | Vaswani et al. | |
| 8,630,291 | B2 | 1/2014 | Shaffer et al. | |
| 8,948,046 | B2 | 2/2015 | Kang et al. | |
| 9,036,509 | B1 | 5/2015 | Addepalli et al. | |
| 9,276,845 | B2 | 3/2016 | Shaffer et al. | |
| 9,356,875 | B2 | 5/2016 | Dasgupta et al. | |
| 2003/0179742 | A1* | 9/2003 | Ogier | H04L 1/1614 370/351 |
| 2005/0073958 | A1* | 4/2005 | Atlas | H04L 45/00 370/238 |
| 2005/0216181 | A1* | 9/2005 | Estkowski | G01C 21/20 701/411 |
| 2008/0181133 | A1 | 7/2008 | Thubert et al. | |
| 2009/0003214 | A1 | 1/2009 | Vaswani et al. | |
| 2009/0003232 | A1 | 1/2009 | Vaswani et al. | |
| 2009/0003356 | A1 | 1/2009 | Vaswani et al. | |
| 2010/0081411 | A1 | 4/2010 | Montenero | |
| 2010/0157838 | A1 | 6/2010 | Vaswani et al. | |
| 2011/0140913 | A1 | 6/2011 | Montenero | |
| 2012/0109399 | A1 | 5/2012 | Tran | |
| 2013/0201316 | A1 | 8/2013 | Binder et al. | |
| 2014/0092769 | A1 | 4/2014 | Shaffer et al. | |
| 2016/0195602 | A1 | 7/2016 | Meadow | |
| 2017/0164264 | A1* | 6/2017 | Kato | H04W 28/14 |
| 2017/0195218 | A1* | 7/2017 | Schrum, Jr. | H04L 45/48 |

OTHER PUBLICATIONS

Jiang et al., "Routing Overhead Minimization in Large-Scale Wireless Mesh Networks", Vehicular Technology Conference, 2007. VTC2007-Spring. IEEE 65th, Apr. 2007, pp. 1270-1274.

Kowalik et al., "Making OLSR Aware of Resource", Wireless Communications, International Conference on Networking and Mobile Computing, WiCom 2007, Sep. 2007, pp. 1488-1493.

Amrita Bose Paul et al., "Modified Optimized Link State Routing (M-OLSR) for Wireless Mesh Networks ", International Conference on Information Technology, 2008. ICIT '08, Dec. 2008, pp. 147-152.

Singh et al., "Load balancing based channel assignment in multicast wireless mesh network", International Conference on Computing for Sustainable Global Development (INDIACom), Mar. 2014, pp. 865-869.

Haoudar et al., "Routing Metric for Wireless Mesh Networks", International Conference on Innovative Computing Technology (INTECH), 2012 Second, Sep. 2012, pp. 57-62.

"Notice of Allowance of Taiwan Counterpart Application," dated Aug. 28, 2017, pp. 1-4, in which the listed references were cited.

* cited by examiner

ROUTING METHOD AND WIRELESS NODE FOR WIRELESS MESH NETWORK

CROSS-REFERENCE TO RELATED APPLICATION

This application claims the priority benefit of Taiwan application serial no. 105135448, filed on Nov. 2, 2016. The entirety of the above-mentioned patent application is hereby incorporated by reference herein and made a part of this specification.

TECHNICAL FIELD

The disclosure relates to a routing method; more particularly, the disclosure relates to a routing method for a wireless mesh network and a wireless node performing the method.

BACKGROUND

A wireless mesh network (WMN) is a communication network made up of a plurality of wireless nodes, and the WMN is used to transmit data among the wireless nodes. Generally speaking, routing policies usually adopted by the WMN include re-active routing policy and pro-active routing policy. Nevertheless, disadvantages can be found in each routing policy. For example, in the re-active routing policy, a node obtains information on its peripheral nodes only. The node performs broadcasting only during data transmission to find an appropriate transmission path, and thus the re-active routing policy often lacks immediacy as a result.

In the pro-active routing policy, every node persistently transmits a control message packet periodically to its peripheral nodes and performs route algorithm to calculate an optimal path when transmitting data in order to maintain the best or good routing for all time. Nevertheless, the method requires transmission of the control message packet on a large scale, resulting in considerably high indirect costs for data transmission. In addition, during data transmission, connection quality changes slightly when affected by factors such as traffic loading or other factors. The calculated optimal path changes constantly, thus leading to network packet transmission failure. The phenomenon is called route flapping. When the route flapping occurs, data transmission time is extended, and lower efficiency is observed, which further prohibits nodes from satisfying the demand for immediacy during data transmission.

SUMMARY

The disclosure provides a WMN routing method and a wireless node to prevent route flapping and lower the transmission traffic of control message packets considerably, so as to satisfy the demand for immediacy and increase data transmission performance.

An exemplary embodiment of the disclosure provides a WMN routing method to be performed on a wireless node. The routing method includes performing a route algorithm and finding a plurality of available paths to reach a destination node, recording the available paths, at least one parent-child node relationship corresponding to the available paths, and at least one link-state in a route table, and transmitting or transferring data by using an optimal path among the available paths. The routing method also includes selecting another available path as the optimal path from the available paths when the optimal path reaching the destination node is not operable, updating the route table, and notifying at least one parent wireless node on the optimal path of a node-deleted message. The routing method further includes performing a block route algorithm when receiving a node-added message from a newly-added node, so as to create a block route table in a block to which the newly-added node belongs, updating the route table according to the block route table to acquire a plurality of updated available paths, selecting an available path as the optimal path from the updated available paths, and notifying the at least one parent wireless node on the optimal path of the node-added message.

An exemplary embodiment of the disclosure provides a wireless node for a WMN, and the wireless node includes a transceiver and a processor. The transceiver is used to transmit and receive messages. The processor is coupled to the transceiver. The processor performs a route algorithm and finds a plurality of available paths to reach a destination node, records the available paths to reach the destination nodes, at least one parent-child node relationship corresponding to the available paths, and at least one link-state in a route table, and transmits or transfers data by using an optimal path. When the optimal path reaching the destination node is not operable, the processor selects another available path as the optimal path from the available paths, updates the route table, and notifies at least one parent wireless node on the optimal path of a node-deleted message. The processor performs a block route algorithm when receiving a node-added message from a newly-added node, so as to create a block route table in a block to which the newly-added node belongs, updates the route table according to the block route table for acquiring a plurality of updated available paths, selects an available path as the optimal path from the updated available paths, and notifies the at least one parent wireless node on the optimal path of the node-added message.

An exemplary embodiment of the disclosure provides a non-transitory computer-readable recording medium storing a program executable by a computer for implementing the above-mentioned WMN routing method.

In view of the foregoing, according to the WMN routing method in the disclosure, after the wireless node finds the optimal path reaching the destination node and other available paths and the WMN becomes stabilized, the wireless node stops performing the route algorithm and transmits or transfers data according to the route table created by the available paths found. In addition, an exemplary embodiment of the disclosure also provides a corresponding method for adding a node and deleting a node in the WMN. Therefore, the method effectively prevents the route flapping phenomenon and lowers transmission capacity of control message packets.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSURED EMBODIMENTS

In the WMN provided by the disclosure, each wireless node stops executing a route algorithm after creating a route table. Only when data transmission fails or an added-node or a deleted-node is found in the WMN, will a control message packet or node-added and node-deleted messages to update the route table. The route table of each node in an updated WMN is then organized. Such a routing method thus lowers transmission capacity of the control message packet and prevents a route flapping phenomenon effectively.

Figure 1:
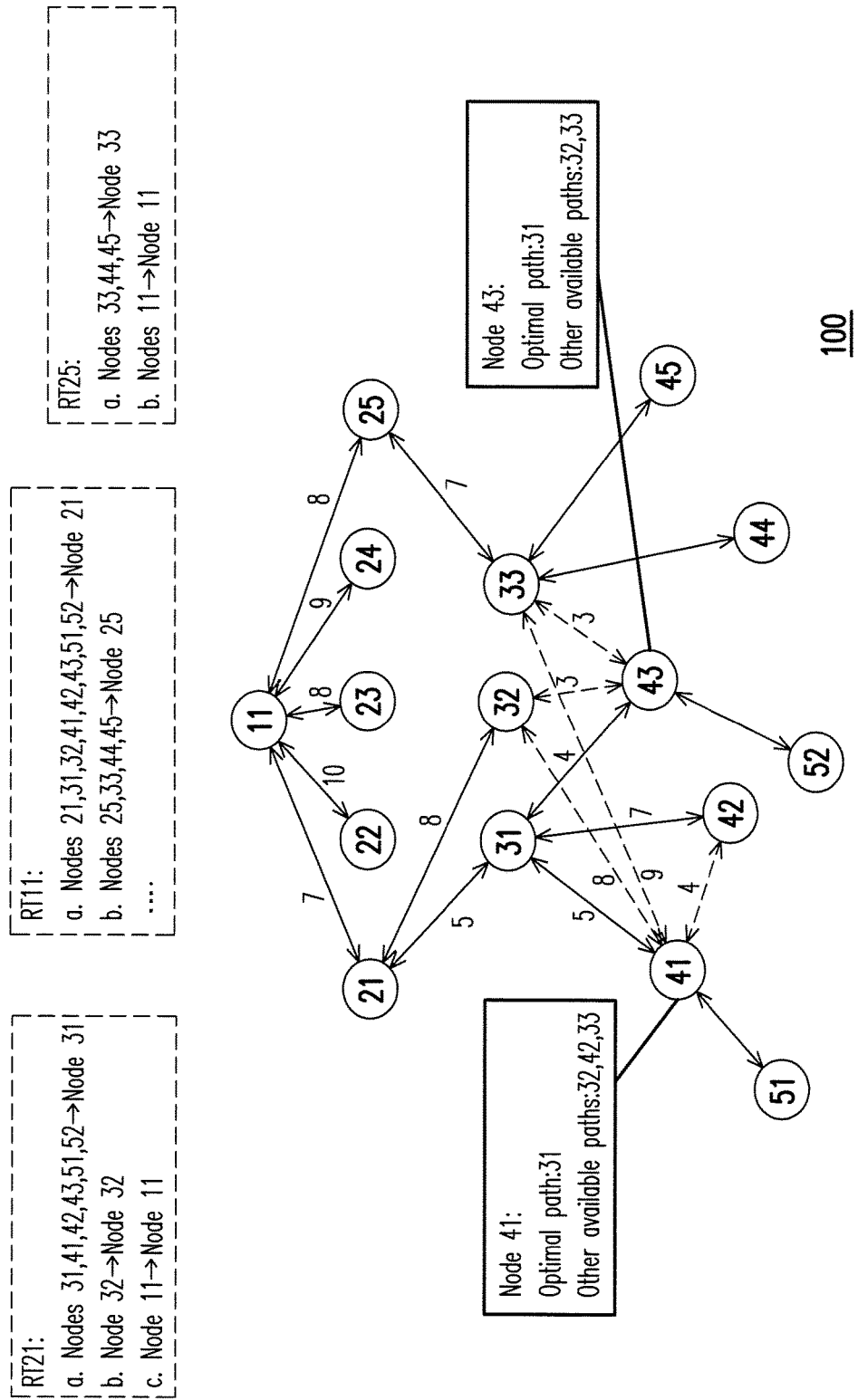
FIG. 1 is a schematic diagram illustrating a WMN according to an exemplary embodiment.

FIG. 1 is a schematic diagram illustrating a WMN according to an exemplary embodiment. Referring to FIG. 1, the WMN 100 includes a plurality of wireless nodes 11, 21 to 25, 31 to 33, 41 to 45, and 51 to 52. Generally speaking, an external gateway node or a data collection point in the WMN usually serves as a destination for a node when transmitting data. The exemplary embodiment provides that the wireless node 11 is regarded as a destination node, and other nodes of the WMN 110 takes the wireless node 11 as the destination node when transmitting data. However, the disclosure is not limited hereto.

Each wireless node in the WMN 100 broadcasts a control message packet to explore network topology information of the WMN 100 and executes a route algorithm to discover an optimal path and all other available paths when transmitting data to the destination wireless node 11. The exemplary embodiment provides that the routing protocol adopted is, for example, an optimized link state routing (OLSR) protocol, and an open shortest path first (OSPF) algorithm is also adopted to calculate all the available paths including the optimal path. However, the disclosure is not limited hereto. Some other exemplary embodiments provide that the routing protocols adopted include but may not be limited to a destination-sequenced distance-vector (DSDV) protocol, a wireless routing protocol (WRP), or a better approach to mobile adhoc networking (BATMAN), etc., and each protocol executes a corresponding route algorithm to calculate all available paths reaching a destination node.

In the exemplary embodiment, the number between two wireless nodes serves to represent the link-state between the two wireless nodes. For example, the link-state represents a link cost between the two wireless nodes when transmitting data. More specifically, the greater the number between the two wireless nodes, the poorer the link-state between the two wireless nodes, or the greater the costs for transmitting data between the two wireless nodes. The exemplary embodiment provides that an optimal path of a wireless node refers to the path which requires the least costs for transmitting data to a destination node by the wireless node. Take the wireless node 41 for example, the optimal path reaching the destination wireless node 11 is a path going through the wireless node 31 and the wireless node 21 and finally reaching the wireless node 11. Moreover, the total numbers of the link-state of the path add up to 17.

In the exemplary embodiment, the node in the WMN 100 is, for example, a network client, a router, or a gateway, but the disclosure is not to be limited hereto.

Figure 2:
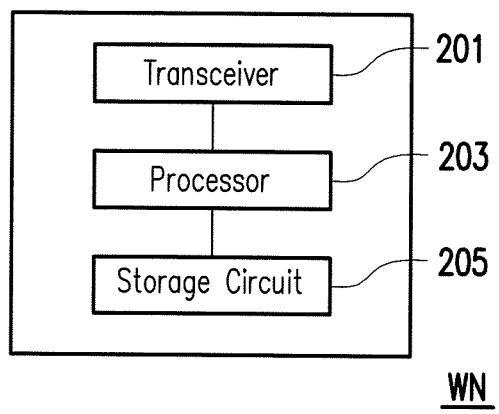
FIG. 2 is a schematic block overview illustrating a wireless node according to an exemplary embodiment.

FIG. 2 is a schematic block overview illustrating a wireless node according to an exemplary embodiment. Referring to FIG. 2, the wireless node WN serves to describe a structure of each wireless node in the WMN 100. In other words, every wireless node 11, 21 to 25, 31 to 33, 41 to 45, and 51 to 52 in FIG. 1 is implemented based on the structure of the wireless node WN.

In the exemplary embodiment, the wireless node WN includes a transceiver 201, a processor 203, and a storage circuit 205.

The transceiver 201 is configured to transmit and receive data wirelessly. For example, the transceiver 201 transmits and receives data by using IEEE 802.11, IEEE 802.15, IEEE 802.16, or other wireless communication technologies, but the disclosure is not limited hereto.

The processor 203 is coupled to the transceiver 201 and configured to control the overall operation of the wireless node WN. The processor 203 may be an apparatus with logic operation ability, such as a central processing unit (CPU), a micro-processor, or an embedded controller, but the disclosure is not to be limited hereto. In the exemplary embodiment, the processor 203 performs the following routing methods.

The storage circuit 205 is coupled to the processor unit 203 and configured to store data. The storage circuit 205 stores the route table required for data transmission. For example, the storage circuit 205 may be a non-volatile memory or a hard disk, but the disclosure is not to be limited hereto.

Figure 3:
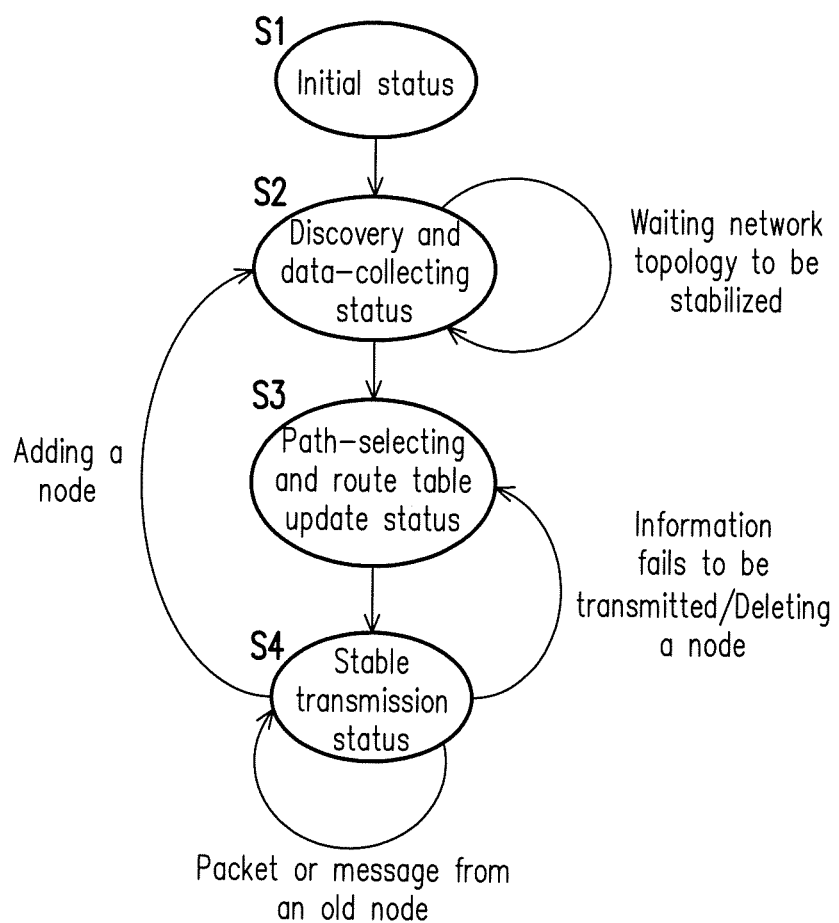
FIG. 3 is a schematic status diagram illustrating a wireless node according to an exemplary embodiment.

FIG. 3 is a schematic status diagram illustrating a wireless node according to an exemplary embodiment. Referring to FIG. 1 to FIG. 3, the exemplary embodiment provides that the wireless node WN includes a first status S1, a second status S2, a third status S3, and a fourth status S4, and the wireless node WN is in only one of the statuses at the same point of time.

The first status S is an initial status after boot when the wireless node WN just joins the WMN. In the first status S1, the wireless node WN is initialized to acquire necessary information and settings, such as a network address, a channel, and a service set identifier (SSID) name.

The second status S2 is a discovery and data-collecting status of the wireless node WN when the network topology information is yet to be set up. In the second status S2, the wireless node WN broadcasts a control message packet, for example, a hello message, to an adjacent wireless node so as to discover the network topology information of the WMN. Through message exchanges, the wireless node WN obtains information such as link-states between itself and the adjacent wireless nodes, link-states between the adjacent wireless nodes and destination nodes, and distribution of at least parts of the nodes in the WMN. The wireless node WN thus finds all available paths reaching the destination node by performing a route algorithm according to the link-states. The network topology information in the embodiment refers to information of distribution of each wireless node in the WMN and the link-states among the wireless nodes, but the disclosure is not to be limited hereto.

Take the wireless node 41 in FIG. 1 for example, in the second status S2, the wireless node 41 discovers the network topology information in the WMN 100 through transmitting a hello message and thus finds its adjacent wireless nodes 31, 32, 33, 42, and 51. In addition, when the wireless node 41 reaches the wireless node 11 through the wireless node 31, 32, 33, and 42, the sum of the numbers of the link-states of each available path is 17, 23, 24, and 23, respectively. Among all the available paths going from the wireless node 41 to the wireless node 11, if the order is arranged according to the link-states, the optimal path is to go through the wireless node 31, and other available paths in order are to go through the wireless node 32 (i.e., the second optimal path), the wireless node 42, and the wireless node 33. However, the disclosure sets no limits to methods performed according to a route algorithm for finding all available paths and an optimal path among the available paths. According to different routing policies adopted by the WMN, people with ordinary skill in the art of the field shall know that other route algorithms adopted to calculate all available paths and their optimal paths are also applicable to the exemplary embodiment of the disclosure.

In addition, in the second status S2, through exchanges of the control message packets with other wireless nodes, the wireless node WN not only acquires the available paths and the corresponding link-states but also acquires at least one parent-child node relationship corresponding to the available paths, and the parent-child node relationship refers to a path of data transmission or transfer to the destination node on the corresponding available path. Relevant description of the parent-child node relationship of the wireless node WN is provided below in detail along with figures.

Particularly, in the exemplary embodiment, before the network topology information discovered by the wireless node WN is stabilized, the wireless node WN stays in the second status S2 and transmits the control message packet consistently and regularly to discover and collect information. On the other hand, when the wireless node WN finds all available paths that reach the destination nodes, and after the nodes in the WMN do not change over a predetermined period of time (for example, the wireless node WN does not receive any node-added message or any node-deleted message), the wireless node WN stops performing the route algorithm.

The third status S3 refers to a path selection and route table update status of the wireless node WN. After the wireless node WN stops performing the route algorithm, the wireless node WN enters into the third status S3. In the third status S3, the wireless node WN selects an optimal path at that moment and records the path to the route table according to the network topology information collected in the second status S2. In addition, when the wireless node WN receives a notification from other nodes of a node change in the WMN (for example, receiving a node-added message or a node-deleted message), the wireless node WN organizes and updates the route table in the third status S3, so as to organize the node changing information into the route table.

In the exemplary embodiment, information recorded in the route table by the wireless node WN also includes all available paths (including the optimal path) acquired for reaching the destination node in the second status S2, at least one parent-child node relationship corresponding to the available paths, and at least one link-state corresponding to the available paths, wherein the optimal path, the available paths, and the link-state are already described; therefore, further description is omitted here.

As for the parent-child node relationship recorded in the route table, the wireless node 21 in FIG. 1 is taken for example. Among the optimal paths of transmitting or transferring data from the wireless node 31, 41, 42, 43, 51, and 52 to the destination wireless node 11, all paths go through the wireless node 31 for transferring data to the wireless node 21 and then transferring the data to the wireless node 11 through the wireless node 21. Therefore, corresponding to the optimal paths, in the route table RT21 of the wireless node 21, the wireless node 31, 41, 42, 43, 51 are recorded as the child wireless nodes of the wireless node 21, and the wireless node 41, 42, 43, 51, and 52 are recorded as the child wireless nodes of the wireless node 31. In other words, a node closer to the destination node or a node with a smaller add-up number of link-states is a node of a higher level, and vice versa. On the other hand, the wireless node 32 is the child wireless node of the wireless node 21; nevertheless, the wireless node 21 does not find in the third status S3 any other lower-level wireless node whose optical path is to transfer data through the wireless node 32; therefore, in the corresponding parent-child node relationship of the optimal path going through the wireless node 21, no other wireless node is recorded as the child wireless node of the wireless node 32. Moreover, the wireless node 11 is recorded as the parent wireless node of the wireless node 21.

In the exemplary embodiment, the parent-child node relationship is defined by a plurality of paths used to transmit data or transfer data through the wireless node 21; nevertheless, in this exemplary embodiment, the route table RT21 of the wireless node 21 further records a parent-child node relationship corresponding to other available paths. In addition, similar recording methods are adopted for route tables of other nodes, such as the route table RTI 1 of the wireless node 11 and the route table RT25 of the wireless node 25; hence, detailed description is omitted hereto.

According to the second status S2, the wireless node WN acquires all available paths to the destination node, the parent-child node relationship corresponding to the available paths, and the link-states corresponding to the available paths, and in the third status S3 the wireless node WN then records the information to the route table maintained by itself.

The fourth status S4 is a stable transmission status of the wireless node WN. In the fourth status S4, the wireless node WN performs data transmission through its self-maintained route table and monitors a control message packet, a node-added message, or a node-deleted message from other nodes at the same time. For example, in the fourth status S4, the wireless node WN transmits data according to an optimal path to the destination node as recorded in the route table or transfers data according to the optimal path to the destination node in the route table when receiving data from other nodes.

In the exemplary embodiment, note that the wireless node WN broadcasts a control message packet only when the wireless node WN is in the second status S2, and the wireless node WN switches from the fourth status S4 back to the second status S2 only when receiving the control message packet or a node-added message from a newly-added node. Therefore, when the WMN 100 runs stably and records little node changes, most of the nodes in the WMN100 run in the fourth status S4, and traffic of the control message packet is low.

On the contrary, if the nodes in the WMN 100 change, for example, a node is deleted in the WMN 100, thus leading to data transmission failure, the wireless node WN switches status from the fourth status S4. Alternatively, when a node is added to the WMN 100, the wireless node WN also switches to other statuses from the fourth status S4.

If data cannot be transmitted through a certain wireless node in the WMN 100, the wireless node may have been deleted or crashed, or a link-state of the wireless node is beyond a tolerable range and the wireless node has to be deleted as a result. The disclosure thus adopts a method of self organizing the paths in order to allow data to be transmitted to the destination wireless node 11 smoothly, and the wireless nodes in the WMN 100 may switch paths freely and perform appropriate updates to the route tables maintained by the wireless nodes.

Figure 4:
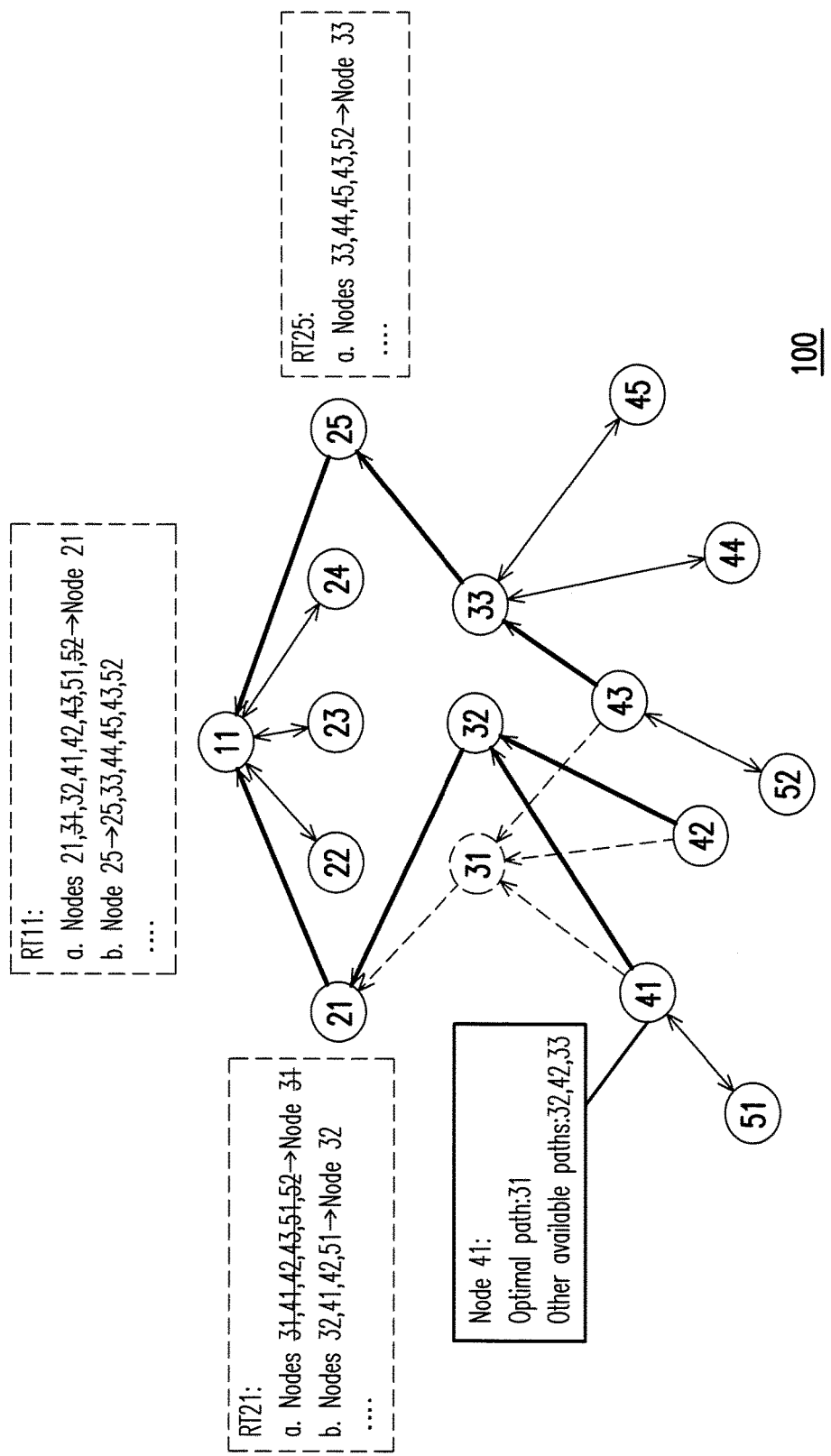
FIG. 4 is a schematic diagram illustrating a deleted node according to an exemplary embodiment.

FIG. 4 is a schematic diagram illustrating a deleted node according to an exemplary embodiment.

Referring to FIG. 4, it is assumed that the wireless node 31 in the WMN 100 shown in FIG. 1 is deleted, while the link-states of the remaining paths stay the same. In the exemplary embodiment, when the wireless node 41 attempts to transmit data, the optimal path (i.e., through the wireless node 31) to the destination wireless node 11 as recorded in the self-maintained route table may be not operable for some reason(s). Thus, the wireless node 41 selects other available paths as the optimal path and switches the transmission path to the selected optimal path. For example, according to a link-state or a link cost, the wireless node 41 selects the second optimal available path (i.e., through the wireless node 32) recorded in the route table as the optimal path and transmits data and a message (i.e. a node-deleted message) of the wireless node 31 already being deleted all together to the wireless node 32, so as to notify the wireless node 32. The node-deleted message sent by the wireless node 41 includes a message of the wireless node 31 already being deleted and a message of at least one child wireless node (e.g., the wireless node 51) transferred through the wireless node 41. Therefore, even when the optimal path or the transmission path is not operable during data transmission, the wireless node 41 immediately switches the transmission path to other available paths, so there is no need to find the new optimal path through broadcasting a control message packet or performing a route algorithm. After switching to another available path, the wireless node 41 switches to the third status S3 to update its self-maintained route table, such that the deleted wireless node 31 is no longer included in the route table of the wireless node 41.

In addition, the node that receives the node-deleted message (i.e., the wireless node 32) also switches to the third status S3 to update its route table and further transmits the node-deleted message to a parent wireless node on an optimal path from the wireless node to a destination wireless node (i.e., the parent wireless node 21 of the wireless node 32), so as to notify the parent wireless node of switching the status to the third status S3 and updating its route table. Over a period of time after the wireless node 31 is deleted, the route table of each node in the WMN 100 can be organized and updated as the route table excluding the wireless node 31.

The wireless node 32 is taken for example. The optimal paths corresponding to the wireless nodes 41, 42, and 51 are respectively recorded as the child wireless nodes 41, 42, and 51 of the wireless node 31 in the route table, and the wireless nodes 41, 42, and 51 are updated as the child wireless nodes of the wireless node 32. The optimal path corresponding to the wireless node 43 is recorded as the child wireless node 43 of the wireless node 31; nevertheless, since its second optimal available path is the wireless node 33, the wireless node 43 is updated as the child wireless node of the wireless node 33. In other words, the optimal paths for transmitting or transferring data through the wireless nodes 41, 42, and 51 are updated from going through the wireless node 31 to going through the wireless node 32, while the optimal path for transmitting or transferring data through the wireless node 43 is updated from going through the wireless node 31 to going through the wireless node 33. After the route table is updated, the wireless node 32 transmits the node-deleted message to the parent wireless node 21 on the optimal path reaching the destination wireless node 11. The node-deleted message includes a message of the wireless node 31 already being deleted and a message of at least one child wireless node transferring through the wireless node 32.

The wireless node 21 is taken for example. After receiving a node-deleted message from the wireless node 32, the wireless node 21 switches to the third status S3 to organize and update the route table. In the route table RT21 of the wireless node 21, the wireless node 31 recorded as the child wireless node of the wireless node 21 is deleted. According to the node-deleted message, the optimal paths corresponding to the wireless nodes 41, 42, and 51 recorded as the child wireless nodes of the wireless node 31 are now recorded as the child wireless nodes of the wireless node 32. In other words, it can be learned from the route table RT21 the optimal paths for transmitting or transferring data through the wireless nodes 41, 42, and 51 are to go through the wireless node 32, and then the data are transferred to the destination wireless node 11 through the wireless node 21.

The wireless node 25 is taken for example. After the wireless node 31 is deleted, the second optimal available path through the wireless node 43 is to go through the wireless node 33. As a result, when the wireless node 43 has to transmit or transfer data, the wireless node 33 receives a node-deleted message from the wireless node 43, and the wireless node 25 receives a node-deleted message from the wireless node 33. According to the received node-deleted messages, in the route table RT25 of the wireless node 25 corresponding to the optimal path through the wireless node 43, the wireless nodes 43 and 52 are also added as the child wireless nodes of the wireless node 33. In other words, it can be seen that from the updated route table RT25 the optimal paths for transmitting or transferring data through the wireless nodes 33, 44, 45, 43, and 52 are to go through the wireless node 33, and then the data are transferred to the destination wireless node 11 through the wireless node 25.

The wireless node 11 is taken for example. After the wireless node 31 is deleted, the wireless node 11 receives a node-deleted message from at least one of the wireless nodes 21-25. After organizing and updating the route table according to the received node-deleted message, the route table RT11 of the wireless node 11 shows the nodes which transmit or transfer data through the wireless node 21 include the wireless nodes 21, 32, 41, 42, and 51 and the nodes that have to transmit or transfer data through the wireless node 25 include the wireless nodes 25, 33, 44, 45, 43, and 52 in optimal paths corresponding each node. In other words, the child wireless nodes of the wireless node 21 includes the wireless node 32, 41, 42, and 51, while the child wireless nodes of the wireless node 25 include the wireless nodes 33, 44, 45, 43, and 52. Similar method can be applied to update the route table of other wireless nodes in the WMN 100, and detailed description is thus omitted.

Therefore, when a wireless node in the WMN 100 is deleted, other wireless nodes in the WMN 100 instantly find the second optimal or preferable available paths by organizing their own paths to transmit data. In addition, when a route table is required to be updated after a wireless node is deleted, every undeleted node does not have to transmit high capacity of control message packets nor does it perform a route algorithm to find an optimal path serving as the transmission path.

In the exemplary embodiment, when a wireless node is added in the WMN 100, in order to lower transmission capacity of a control message packet, a block routing method is adopted; by using the method, only the adjacent nodes of the newly-added node perform broadcast the control message packet and perform a block route algorithm to update a route table.

Figure 5:
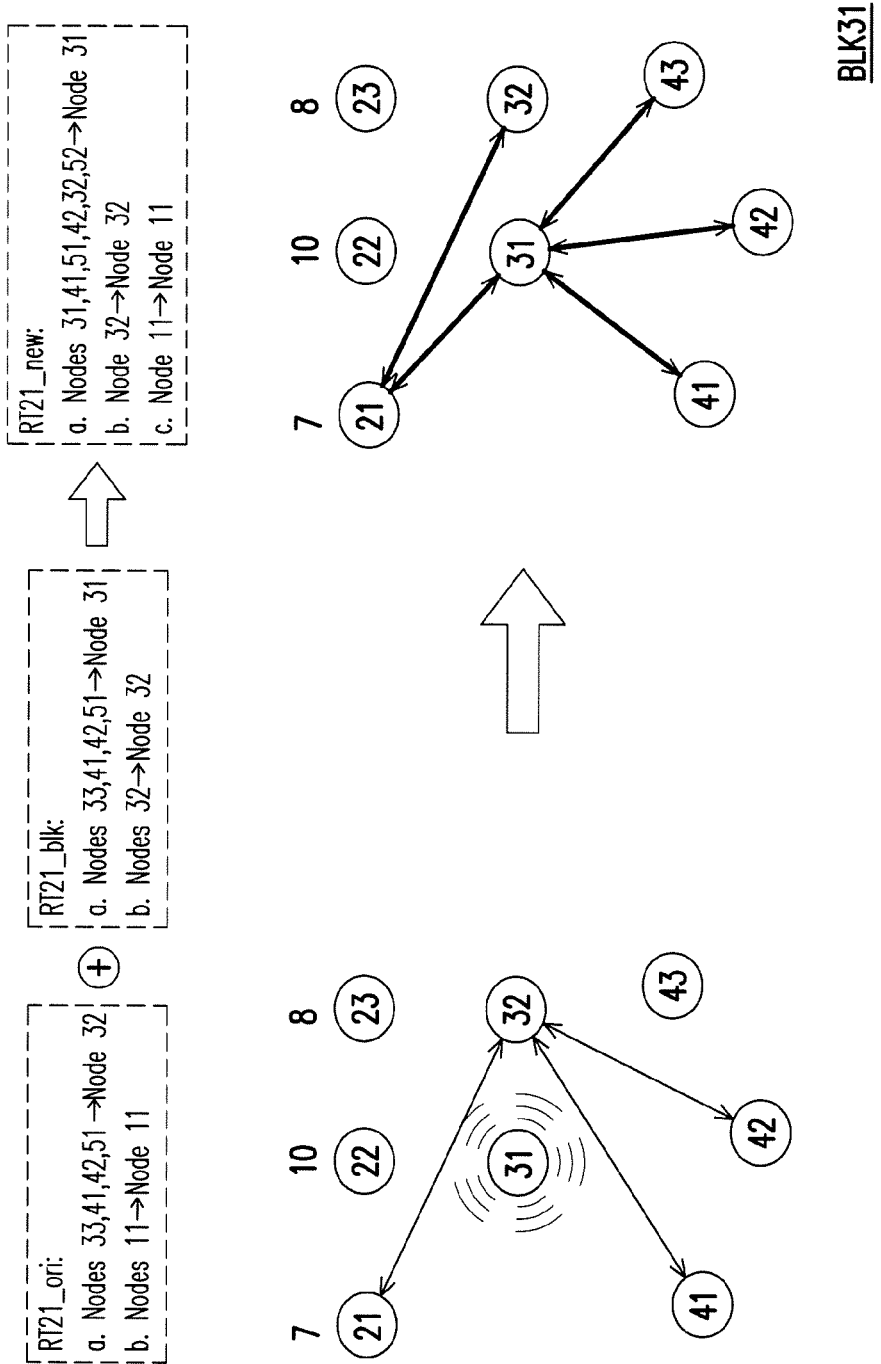
FIG. 5 is a schematic diagram illustrating an added node according to an exemplary embodiment.

FIG. 5 is a schematic diagram illustrating an added node according to an exemplary embodiment.

Referring to FIG. 5, the wireless node 31 deleted in FIG. 4 in the exemplary embodiment is added to the WMN 100. The newly-added wireless node 31 is initialized in the first status S1 and then broadcasts a control message packet (e.g., including a hello message or a node-added message) to adjacent wireless nodes in the second status S2. Through message exchanges, the wireless node 31 finds its adjacent nodes as well as acquires the link-states between the wireless node 31 and the adjacent nodes and the link-states between the adjacent nodes and the destination node. As a result, the wireless node 31 and its adjacent nodes constitute the block BLK31. For example, these adjacent nodes are wireless nodes within the wireless transmission range of the wireless node 31 and are able to receive the broadcast from the wireless node 31.

In some embodiments that each wireless node in the WMN relays a broadcast the control message packet or the node-added message and performs the block route algorithm only when receiving the control message packet or the node-added message from a newly-added wireless node. Therefore, when adding a new wireless node, only the wireless nodes in a block to which the newly-added node belongs broadcast the control message packet and performs the block route algorithm. Thereby, a newly-added available path reaching the destination node from each of the wireless nodes in the block can be found, and the block route table can be created. Here, it is not necessary for each wireless node in the entire WMN to broadcast the control message packet or to perform any route algorithm. The newly-added available path is, for example, an available path added to the block because the newly-added wireless node is being added to the WMN.

In particular, in the exemplary embodiment, the newly-added wireless node 31 and its adjacent wireless nodes 21, 22, 23, 32, 41, 42, and 43 form a block BLK31, and these adjacent nodes 21, 22, 23, 32, 41, 42, and 43 receive a control message packet or a node-added message from the wireless node 31, for instance, so as to notify the adjacent wireless nodes 21, 22, 23, 32, 41, 42, and 43 of the message of adding the wireless node 31. Therefore, the wireless nodes 21, 22, 23, 32, 41, 42, and 43 switch to the second status S2. In the second status S2, the wireless nodes 21, 22, 23, 32, 41, 42, and 43 transfer the broadcast control message packet and perform the block route algorithm to find at least one newly-added available path reaching the destination wireless node 11 in the block BLK31. In addition, the exemplary embodiment provides that when the wireless nodes broadcast the control message packet and perform the block route algorithm, the wireless nodes also acquire at least one parent-child node relationship corresponding to each newly-added available path of each wireless node in the block BLK31, and the parent-child node relationship refers to a data transmission path through each wireless node in the block BLK31.

More particularly, other wireless nodes that do not belong to the block BLK31 do not receive the control message packet or the node-added message from the newly-added wireless node 31. Therefore, the wireless nodes that do not belong to the block BLK31 do not switch to the second status S2, nor do the wireless nodes transfer any broadcast control message packet or perform any route algorithm. For example, the wireless node 24 and the wireless node 33 may receive a node-added message from the wireless node 32; nonetheless, since the node-added message does not come from the newly-added wireless node 31, the wireless node 24 and the wireless node 33 do not switch to the second status S2 but switch to a third status S3 in order to update their self-maintained route tables according to the received node-added message. Moreover, the wireless node 24 and the wireless node 33 notify at least one parent wireless node on their optimal paths of the node-added message, so as to update the route table of the at least one parent wireless node. Other examples may be derived from the above-mentioned example. In another example, the wireless node 24 and the wireless node 33 may receive a control message packet broadcast by the wireless node 32; however, since the control message packet does not come from the newly-added wireless node 31, the wireless node 24 and the wireless node 33 do not switch to the second status S2 to transfer the broadcast control message packet. Instead, the wireless node 24 and the wireless node 33 stay in the fourth status S4.

In the exemplary embodiment, before the wireless node 31 is added, each node in the block BLK31 stays in the fourth status S4, for example, and a link-state (or the link cost) reaching a destination node has been calculated. For example, the values of the link-states of the optimal paths from the wireless nodes 21, 22, and 23 to the destination wireless node 11 are 7, 10, and 8, respectively. Therefore, according to the recorded link-states (e.g., loaded from the original route table), each wireless node in the block BLK31 calculates at least one newly-added available path reaching the wireless node 11 in the block BLK31 and a corresponding link-state by executing the block route algorithm, and then each wireless node in the block BLK31 calculates a newly-added optimal path and creates a block route table. Next, every wireless node updates the route table in the third status S3 and further transmits the node-added message to at least one parent wireless node on the optimal path.

The wireless node 21 is taken for example. Before the wireless node 21 receives the node-added message from the newly-added wireless node 31, in the optimal paths corresponding to the wireless nodes 41, 42, and 51, the wireless node 32 is recorded as the child wireless node of the wireless node 21, the wireless nodes 41, 42, and 51 are recorded as the child wireless nodes of the wireless node 32, and the wireless node 11 is recorded as the parent wireless node of the wireless node 21 according to the original route table RT21_ori.

After the wireless node 21 in the block BLK31 receives the control message packet or the node-added message from the wireless node 31 and performs the block route algorithm, the wireless node 21 creates a block route table RT21_blk with the parent-child node relationships of the wireless node 21 and other nodes in the block BLK31. Moreover, in the newly-added optimal path, the wireless node 31 is recorded as the child wireless node of the wireless node 21, while the wireless nodes 41, 42, and 43 are recorded as the child wireless nodes of the wireless node 31. In addition, the wireless node 32 is also recorded as the child wireless node of the wireless node 21. From the block route table RT21_blk of the wireless node 21, it can be seen that in the block BLK31 created when the wireless node 31 is added, the wireless nodes 31, 41, 42, and 43 transfer data to the wireless node 21 optimally through the wireless node 31, while the wireless node 32 transmits data directly to the wireless node 21.

Next, in the third status S3, the wireless node 21 organizes its original route table RT21_ori and the block route table RT21_blk to obtain a new route table RT21_new that records a plurality of updated available paths, and the wireless node 21 then selects a path as the optimal path from the updated available paths. In the new route table RT21_new, it can be seen that when data are transferred or transmitted from the wireless nodes 31, 41, 42, 43, and 51, the optimal paths are to go through the wireless node 31. In addition, since the wireless node 52 transfers data optimally through the wireless node 43, the wireless node 52 also transfers data through the wireless node 31. In the new route table RT21_new, the wireless node 32 transmits data directly to the wireless node 21, and the wireless node 11 is the parent wireless node of the wireless node 21. Take the wireless node 21 for example, when data are transmitted to the destination wireless node 11, the optimal path is not to go through any other node; instead, the data are directly transmitted to the wireless node 11. Take the wireless node 41 for example, the optimal path for transmitting data to the destination wireless node 11 is to go through the wireless node 31, and then the data are transferred to the wireless node 11 through the wireless node 21.

After the wireless node 21 updates and organizes the route table RT21_new, the wireless node 21 further notifies its parent wireless node (i.e., the wireless node 11) of the node-added message in the third status S3, so as to notify the parent wireless node to update the route table according to the node-added message. The node-added message transmitted by the wireless node 21 includes a message of adding the wireless node 31 and a message of at least one child wireless node transferred by the wireless node 21

In the exemplary embodiment, the block route table also includes at least one available path and at least one link-state in the block. For example, after the wireless node 32 broadcasts the control message packet and performs the block route algorithm, the wireless node 32 finds all available paths from the wireless node 32 to the destination node 11 (i.e., through the wireless nodes 21, 22, and 23) in the block BLK31 and obtains the link-states corresponding to the available paths, and the wireless node 32 records the available paths and the link-states in the block route table. More specifically, when performing the block route algorithm, the wireless node not only obtains newly-added available paths but also acquires non-newly-added available paths (namely the available paths already existing in the original route table) and records both types of paths in the block route table. By organizing the original route table and the block route table of the wireless node 32, a new route table of the wireless node 32 recording a plurality of updated available paths is thus acquired.

In the exemplary embodiment, when a wireless node is added to the WMN 100, only the wireless nodes adjacent to the newly-added wireless node switch to the second status S2, while other wireless nodes in the WMN 100 only have to update their route tables when receiving a node-added message. The traffic of the required control message packet transmission is significantly reduced as a result.

Figure 6:
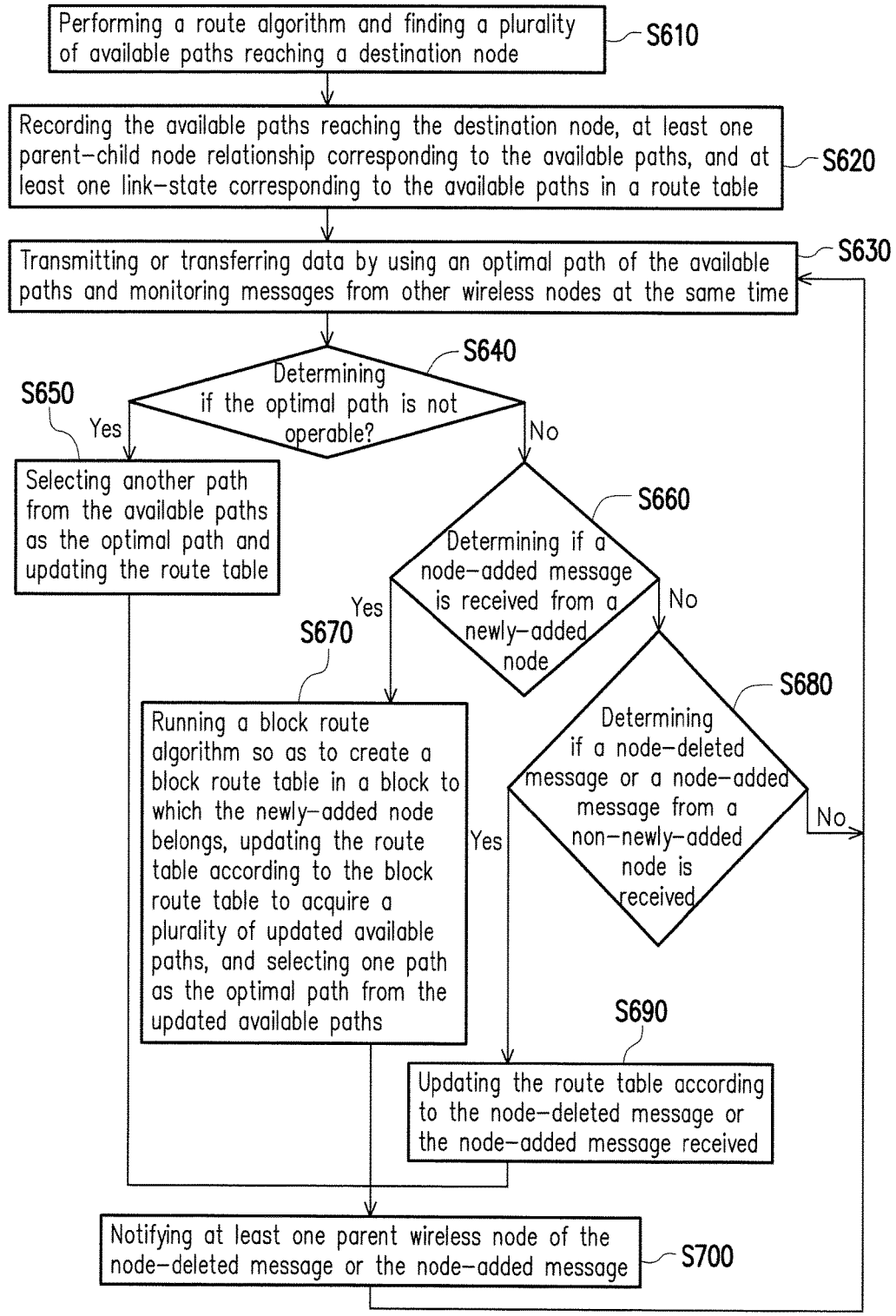
FIG. 6 is a schematic flowchart illustrating a WMN routing method according to an exemplary embodiment.

FIG. 6 is a schematic flowchart illustrating a WMN routing method according to an exemplary embodiment.

Referring to both FIG. 2 and FIG. 6, the routing method of the WMN is performed by the processor 203 of the wireless node WN.

First, in step S610, the processor 203 of the wireless node WN performs a route algorithm and finds a plurality of available paths to the destination node. The available paths include an optimal path. After finding the available paths including the optimal path, the processor 203 stops performing the route algorithm. In step S620, the processor 203 records the available paths to reach the destination node, at least one parent-child node relationship corresponding to the available paths, and at least one link-state corresponding to the available paths in a route table. In step S630, the processor 203 transmits or transfers data by using an optimal path of the available paths according to the route table created and monitors messages from other nodes at the same time. The wireless node WN stays in a stable operation status at the moment.

During the operation process, the deletion of a certain node or a poor link-state of a path in the WMN may lead to malfunction of the transmission path; at this time, switching to another path is required for completing the data transmission. On the other hand, when a node is added to the WMN, a new path has to be calculated to increase data transmission performance. The exemplary embodiment provides that the processor 203 determines whether said condition occurs according to the messages monitored.

The processor 203 determines if the optimal path reaching the destination node is not operable according to the message monitored in step S640. When the processor 203 determines that the optimal path reaching the destination node is not operable, in step S650, the processor 203 selects another path from the available paths as the optimal path and updates the route table according to the selected optimal path.

If the processor 203 determines that the optimal path is operable in step S640 according to the monitored messages, in step S660, the processor 203 further determines if a node-added message is received from a newly-added node. When the processor 203 determines that the node-added message is received from the newly-added node, in step S670, the processor 203 performs a block route algorithm to create a block route table in a block to which the newly-added node belongs. The processor 203 further updates the route table according to the block route table to acquire a plurality of updated available paths and selects one path from the updated available paths as an optimal path.

In addition, in step S660, if the processor 203 determines that the node-added message from the newly-added node is not received, in step S680, the processor 203 determines if a node-deleted message or a node-added message from a non-newly-added node is received. If the processor 203 determines that a node-deleted message or a node-added message from a non-newly-added node is received, in step S690, the processor 203 updates the route table according to the node-deleted message or the node-added message received.

After the processor 203 updates the route table in step S650, S670, or S690, the processor 203 in step S700 notifies at least one parent wireless node on the optimal path of the node-deleted message or the node-added message, and then the processor 203 returns to step S630 and transmits or transfers data through the optimal path according to the updated route table and monitors messages from other nodes at the same time. Moreover, if the processor 203 determines in step S680 that no node-deleted message nor the node-added message from the non-newly-added node is received, the processor 203 still returns to step S630 and transmits or transfers data through the optimal path according to the route table and monitors messages from other nodes at the same time.

In some embodiments that the processor 203 determines whether to perform step S650, S670, S690, or S700 according to the monitored messages from other wireless nodes;

therefore, the order of steps, S650, S670, S690, and S700 in FIG. 6 is merely exemplary and should not be construed as a limitation to the disclosure.

Embodiments of each of the steps S610 to S700 are described in detail in paragraphs provided above with reference to FIG. 1 to FIG. 5, and detail description is thus omitted here.

In the exemplary embodiment, the flowchart in FIG. 6 is implemented by programming codes that are stored in the storage circuit 205, and the processor 203 performs the programming codes to complete the routing method when the wireless node WN is activated. However, it must be known that each process and step in FIG. 6 may also be implemented by a hardware circuit. For example, in another exemplary embodiment, the wireless node WN further includes an initial module, a route module, a block route module, a route table recording module, a self-organized path module, a transmission module, and so on, and moreover, each module is coupled to the processor 203 and respectively responsible for every operation of the wireless node WN. For example, the initial module is configured to initialize the wireless node WN to obtain necessary information and settings. The route module is configured to discover the network topology information of the WMN 100, including performing a route algorithm, so as to find a plurality of available paths to reach a destination node in the WMN 100; the block route module is configured to perform a block route algorithm when a new node is added, so as to create the block route table in a block to which the newly-added node belongs; the route table recording module is configured to maintain the route table of the wireless node WN, including selecting an optimal path and recording the optimal path in the route table, recording a plurality of available paths, a corresponding parent-child node relationship, and a link-state in the route table, and updating the route table according to a node-deleted message or a node-added message; the self-organized path module is configured to select another path from the available paths in the route table to transmit data when the optimal path for transmitting data is not operable; the transmission module is configured to receive and send data or messages through the transceiver 201, including transmitting or transferring data, notifying a parent node on the optimal path of the node-deleted message or the node-added message, etc.

An exemplary embodiment of the disclosure also provides a computer-readable recording medium storing program, wherein the program is composed of a plurality of programming commands. More particularly, when the computer loads and performs (or executes) the program, the steps of the WMN routing method are completed, and the computer is then equipped with a WMN routing function.

Overall, according to the WMN routing method provided herein, after the wireless node is initialized and finds the optimal path and all other available paths reaching the destination node, the route algorithm stops performing, and data are transmitted and transferred according to the optimal path recorded in the route table. Thereby, the route flapping phenomenon can be effectively prevented, and the traffic of the control message packet is reduced, so as to save costs. On the other hand, the WMN routing method of the disclosure also provides measures taken in response to the addition or deletion of the wireless node in the WMN. When a node is deleted from the WMN, the wireless node in the disclosure organizes its own path and selects a path that does not go through the deleted node as the optimal path from the route table to transmit data and notifies the parent wireless node on the optimal path of the node-deleted message. By doing so, the wireless node immediately responds to the deletion of the node in no need of re-broadcasting the control message packet. When a new node is added to the WMN, only the wireless nodes adjacent to the newly-added wireless node broadcast the control message packet and perform the block route algorithm to update the route table. By doing so, other wireless nodes in the WMN do not have to perform the route algorithm and broadcast the control message packet. Therefore, the WMN routing method and the wireless nodes provided by the disclosure satisfy immediacy requirement and increase data transmission performance effectively.

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

What is claimed is:

1. A routing method for a wireless mesh network, the routing method being performed on a wireless node of a plurality of nodes of the wireless mesh network and comprising:

transmitting a control message packet for finding a plurality of available paths to reach a destination node of the plurality of nodes by performing a route algorithm to discover a topology of the wireless mesh network, and stopping performing the route algorithm after the plurality of available paths are found;

recording the available paths to reach the destination node, at least one parent-child node relationship corresponding to the available paths, and at least one link-state corresponding to the available paths in a route table;

using an optimal path among the available paths to transmit data or transfer data;

in response to the optimal path reaching the destination node being not operable, selecting another available path as the optimal path from the available paths, updating the route table, and notifying at least one parent wireless node on the optimal path of a node-deleted message;

in response to a node-added message being received from a newly-added node, relaying the node-added message and performing a block route algorithm for creating a block route table in a block to which the newly-added node belongs, updating the route table according to the block route table to acquire a plurality of updated available paths, selecting a path as the optimal path from the updated available paths, and notifying the at least one parent wireless node on the optimal path of the node-added message, wherein the block to which the newly-added node belongs is consist of the newly-added node and a part of the wireless mesh network and the part of the wireless mesh network comprises at least one adjacent node of the newly-added node in the wireless mesh network, and the wireless node is one of the at least one adjacent node; and in response to the node-added message not being relayed from any wireless node in the block, not relaying the node-added message and not performing the block route algorithm.

2. The routing method as claimed in claim 1, wherein an optimized link state routing (OLSR) protocol is adopted in the route algorithm.

3. The routing method as claimed in claim 1, wherein the available paths are calculated based on an open shortest path first (OSPF) algorithm.

4. The routing method as claimed in claim 1, wherein the at least one link-state comprises at least one connection quality cost.

5. The routing method as claimed in claim 4, wherein when the optimal path of the available paths reaching the destination node is not operable, the step of selecting the another available path as the optimal path from the available paths comprises:
   determining the another available path as the optimal path according to the at least one connection quality cost of the route table.

6. The routing method as claimed in claim 1, wherein the step of performing the block route algorithm for creating the block route table in the block to which the newly-added node belongs comprises:
   loading from the route table the at least one link-state from each of the at least one adjacent node of the block to the destination node.

7. The routing method as claimed in claim 6, wherein the block route table comprises at least one newly-added available path from the block to the destination node and the at least one parent-child node relationship corresponding to the at least one newly-added available path.

8. The routing method as claimed in claim 1, wherein the node-added message and the node-deleted message comprise a message of at least one child wireless node of the wireless node.

9. A wireless node for a wireless mesh network, the wireless node comprising:
   a transceiver for transmitting and receiving data; and
   a processor coupled to the transceiver,
   wherein the processor transmits a control message packet through the transceiver for finding a plurality of available paths to reach a destination node of a plurality of nodes of the wireless mesh network by performing a route algorithm to discover a topology of the wireless mesh network, and stops performing the route algorithm after the plurality of available paths are found,
   wherein the processor records the available paths to reach the destination node, at least one parent-child node relationship corresponding to the available paths, and at least one link-state corresponding to the available paths in a route table, and transmitting the data or transferring the data by using an optimal path among the available paths,
   in response to the optimal path reaching the destination node being not operable, the processor selects another available path as the optimal path from the available paths, updates the route table, and notifies at least one parent wireless node on the optimal path of a node-deleted message,
   in response to receiving a node-added message being received from a newly-added node, the processor relays the node-added message and performs a block route algorithm to create a block route table in a block to which the newly-added node belongs, update the route table according to the block route table for acquiring a plurality updated available paths, select a path as the optimal path from the updated available paths, and notify the at least one parent wireless node on the optimal path of the node-added messag; wherein the block to which the newly-added node belongs is consist of the newly added node and a part of the wireless mesh network and the part of the wireless mesh network comprises at least one adjacent node of the newly-added node in the wireless mesh network, and the wireless node is one of the at least one adjacent node, and
   in response to the node-added message not being relayed from any wireless node in the block, not relaying the node-added message and not performing the block route algorithm.

10. The wireless node as claimed in claim 9, wherein the processor adopts an optimized link state routing (OLSR) protocol to perform the route algorithm.

11. The wireless node as claimed in claim 9, wherein the processor calculates the available paths based on an open shortest path first (OSPF) algorithm.

12. The wireless node as claimed in claim 9, wherein the at least one link-state comprises at least one connection quality cost.

13. The wireless node as claimed in claim 12, wherein when the optimal path of the available paths to the destination node is not operable, the processor determines the another available path as the optimal path according to the at least one connection quality cost of the route table.

14. The wireless node as claimed in claim 9, wherein when the block route algorithm is performed, the processor loads the at least one link-state from each of the at least one adjacent node of the block to the destination node from the route table.

15. The wireless node as claim in claim 14, wherein the block route table comprises at least one newly-added available path to the destination node from the block and at least one of the at least one parent-child node relationship corresponding to the at least one newly-added available path.

16. The wireless node as claimed in claim 9, wherein the node-added message and the node-deleted message comprise a message of at least one child wireless node of the wireless node.

17. A non-transitory computer-readable recording medium storing a program executable by a computer to complete the routing method claimed in claim 1.

* * * * *